(12) United States Patent
Yamada et al.

(10) Patent No.: US 10,869,098 B2
(45) Date of Patent: Dec. 15, 2020

(54) INFORMATION PROCESSING TERMINAL, INFORMATION PROCESSING METHOD AND PROGRAM

(71) Applicant: Sony Corporation, Tokyo (JP)

(72) Inventors: Sohei Yamada, Kanagawa (JP); Masato Fujii, Kanagawa (JP)

(73) Assignee: Sony Corporation

(*) Notice: Subject to any disclaimer, the term of this patent is extended or adjusted under 35 U.S.C. 154(b) by 0 days.

(21) Appl. No.: 16/331,365

(22) PCT Filed: Sep. 15, 2017

(86) PCT No.: PCT/JP2017/033526
§ 371 (c)(1),
(2) Date: Mar. 7, 2019

(87) PCT Pub. No.: WO2018/061836
PCT Pub. Date: Apr. 5, 2018

(65) Prior Publication Data
US 2019/0364342 A1 Nov. 28, 2019

(30) Foreign Application Priority Data
Sep. 29, 2016 (JP) ................................. 2016-190719

(51) Int. Cl.
*G06F 3/00* (2006.01)
*H04N 21/485* (2011.01)
(Continued)

(52) U.S. Cl.
CPC ..... *H04N 21/4852* (2013.01); *H04N 21/2187* (2013.01); *H04N 21/4396* (2013.01); *H04N 21/6587* (2013.01)

(58) Field of Classification Search
CPC .......... H04N 21/4312; H04N 21/4316; H04N 21/4438; H04N 21/4852; H04N 21/2187;
(Continued)

(56) References Cited

U.S. PATENT DOCUMENTS

| | | | | |
|---|---|---|---|---|
| 2003/0093792 | A1* | 5/2003 | Labeeb | H04N 7/163 725/46 |
| 2014/0282730 | A1* | 9/2014 | Hieb | H04N 21/482 725/41 |
| 2017/0085942 | A1* | 3/2017 | Parmar | H04N 21/4334 |

FOREIGN PATENT DOCUMENTS

| | | |
|---|---|---|
| JP | 2009177595 A | 8/2009 |
| JP | 2013062653 A | 4/2013 |
| JP | 2016001787 A | 1/2016 |

OTHER PUBLICATIONS

Volker Hilt et al., Recording and Playing Back Interactive Media Streams, Oct. 1, 2005, IEEE Xplore, vol. 7, No. 5, pp. 960-971 (Year: 2005).*

(Continued)

*Primary Examiner* — Tam T Tran
(74) *Attorney, Agent, or Firm* — Lerner, David, Littenberg, Krumholz & Mentlik, LLP

(57) ABSTRACT

In the information processing terminal of the present technology, in a case where a mode is set to display screens of a plurality of applications being executed respectively on different display areas at the same time, and a video of the contents being reproduced by a first application is displayed on a first display area and, at the same time, a screen of a second application is displayed on a second display area, the reproduction of the contents is stopped when the contents being reproduced are recorded contents and the reproduction of the contents is continued when the contents being reproduced are live-viewing contents, when a sound output by the second application is started, and the display of the video of (Continued)

the contents whose reproduction has been continued is continued on the first display area and the audio of the contents whose reproduction has been continued is muted.

7 Claims, 10 Drawing Sheets

(51) Int. Cl.
*H04N 21/2187* (2011.01)
*H04N 21/439* (2011.01)
*H04N 21/6587* (2011.01)

(58) Field of Classification Search
CPC .. H04N 21/4396; H04N 21/6587; H04N 5/60; H04N 5/44591; G06F 3/165
See application file for complete search history.

(56) References Cited

OTHER PUBLICATIONS

Bo Gao et al., Beyound the Playlist: Seamless Playback of Structured Video Clips, Aug. 1, 2010, IEEE Xplore, pp. 1495-1501 (Year: 2010).*
International Search Report based on PCT/JP2017/033526, dated Nov. 21, 2017, 2 pgs.

* cited by examiner

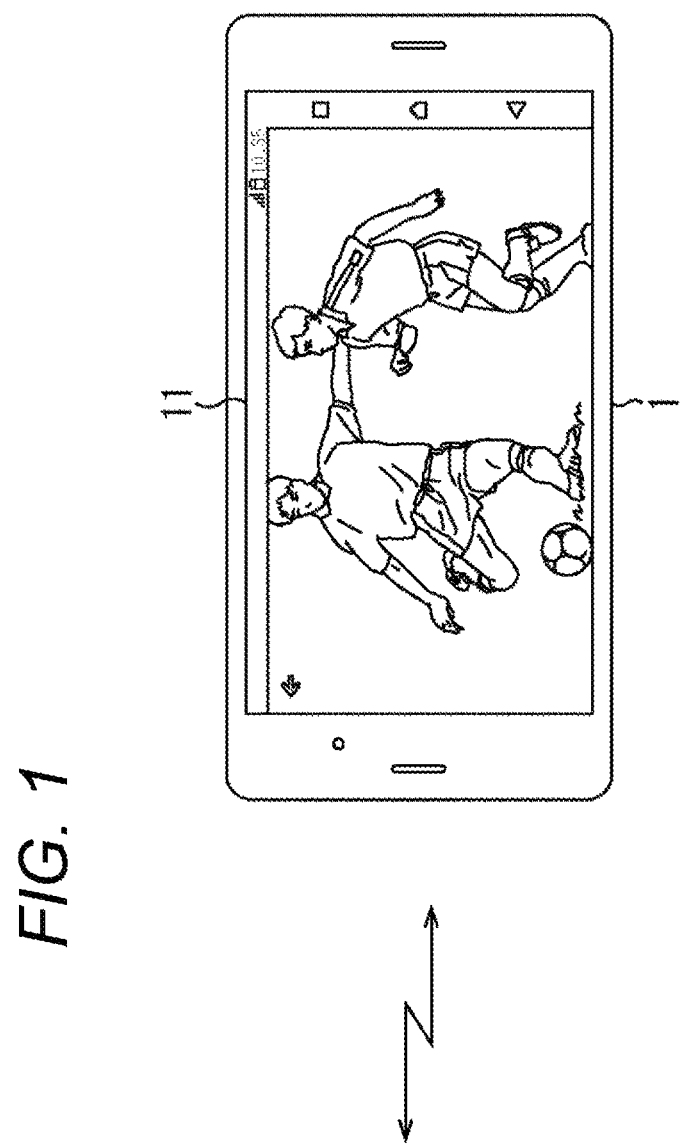
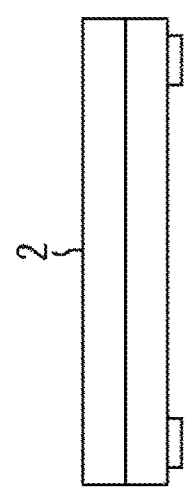
FIG. 1

INFORMATION PROCESSING TERMINAL, INFORMATION PROCESSING METHOD AND PROGRAM

CROSS-REFERENCE TO RELATED APPLICATIONS

This application is a national phase entry under 35 U.S.C. § 371 of International Application No. PCT/JP2017/033526 filed Sep. 15, 2017, which claims the priority from Japanese Patent Application No. 2016-190719 filed in the Japanese Patent Office on Sep. 29, 2016, the entire contents of which are hereby incorporated by reference.

TECHNICAL FIELD

The present technology relates to an information processing terminal, an information processing method, and a program. In particular, it relates to an information processing terminal, an information processing method, and a program that can appropriately control an audio output of contents being reproduced.

BACKGROUND ART

It is common to view television programs using portable terminals such as smartphones and tablet terminals. For example, a user can transfer a program recorded by a recording device at home to a portable terminal and store the program in a built-in memory, so that the user can view the recorded program even at a place outside home.

In addition, the user can transfer a broadcasting program received by the recording device to the portable terminal in real time, so that the user can view the broadcasting program using a portable terminal not equipped with a tuner or the like as a television receiver.

CITATION LIST

Patent Document

Patent Document 1: Japanese Patent Application Laid-Open No. 2013-062653

SUMMARY OF THE INVENTION

Problems to be Solved by the Invention

Due to an increase in size and resolution of a display mounted on a portable terminal, it is expected, in the future, that displaying and using screens of a plurality of applications simultaneously on the display of the portable terminal will become common practice.

The present technology has been made in view of such a situation, and intends to be capable of appropriately controlling an audio output of contents being reproduced.

Solutions to Problems

An information processing terminal according to an aspect of the present technology includes: a reproduction unit that reproduces contents including video and audio; a reproduction control unit that, in a case where a display mode of a display is set to a mode that displays screens of a plurality of applications being executed on different display areas respectively at the same time, the applications including a first application that manages reproduction of the contents, and the video of the contents being reproduced is displayed on a first display area and, at the same time, a screen of a second application is displayed on a second display area, stops reproducing the contents when the contents being reproduced are recorded contents and continues reproducing the contents when the contents being reproduced are live-viewing contents, at the time of starting a sound output by the second application; and an output control unit that continues displaying the video of the contents whose reproduction has been continued on the first display area and mutes the audio of the contents whose reproduction has been continued.

In a case where the second application is an application not accompanied with the sound output and a user performs an operation of the second application, the reproduction control unit can continue reproducing the contents even when the contents being reproduced are recorded contents.

In a case where the reproduction of the recorded contents is stopped, the reproduction control unit can restart reproducing the recorded contents when an operation is performed for the first display area, and the output control unit can restart displaying the video of the contents whose reproduction has been restarted and outputting the audio of the contents whose reproduction has been restarted.

While the reproduction of the recorded content is stopped, the output control unit can continue displaying, as a still image, one frame of the video before the reproduction is stopped on the first display area.

In a case where the audio of the live-viewing contents is muted, the output control unit can restart outputting the audio when an operation is performed for the first display area.

According to an aspect of the present technology, in a case where a display mode of a display is set to a mode that displays screens of a plurality of applications being executed respectively on different display areas at the same time, the applications including a first application that manages reproduction of the contents, and the video of the contents being reproduced is displayed on a first display area and, at the same time, a screen of a second application is displayed on a second display area, the reproduction of the contents is stopped when the contents being reproduced are recorded contents and the reproduction of the contents is continued when the contents being reproduced are live-viewing contents, when a sound output by the second application is started. Further, the display of the video of the contents whose reproduction has been continued is continued on the first display area and the audio of the contents whose reproduction has been continued is muted.

Effects of the Invention

According to the present technology, it is possible to appropriately control an audio output of contents being reproduced.

Incidentally, the effects described herein are not necessarily limited, and any of the effects described in the present disclosure may be applied.

BRIEF DESCRIPTION OF DRAWINGS

FIG. 1 is a diagram illustrating a configuration example of a contents-viewing system according to an embodiment of the present technology.

MODE FOR CARRYING OUT THE INVENTION

Figure 2:
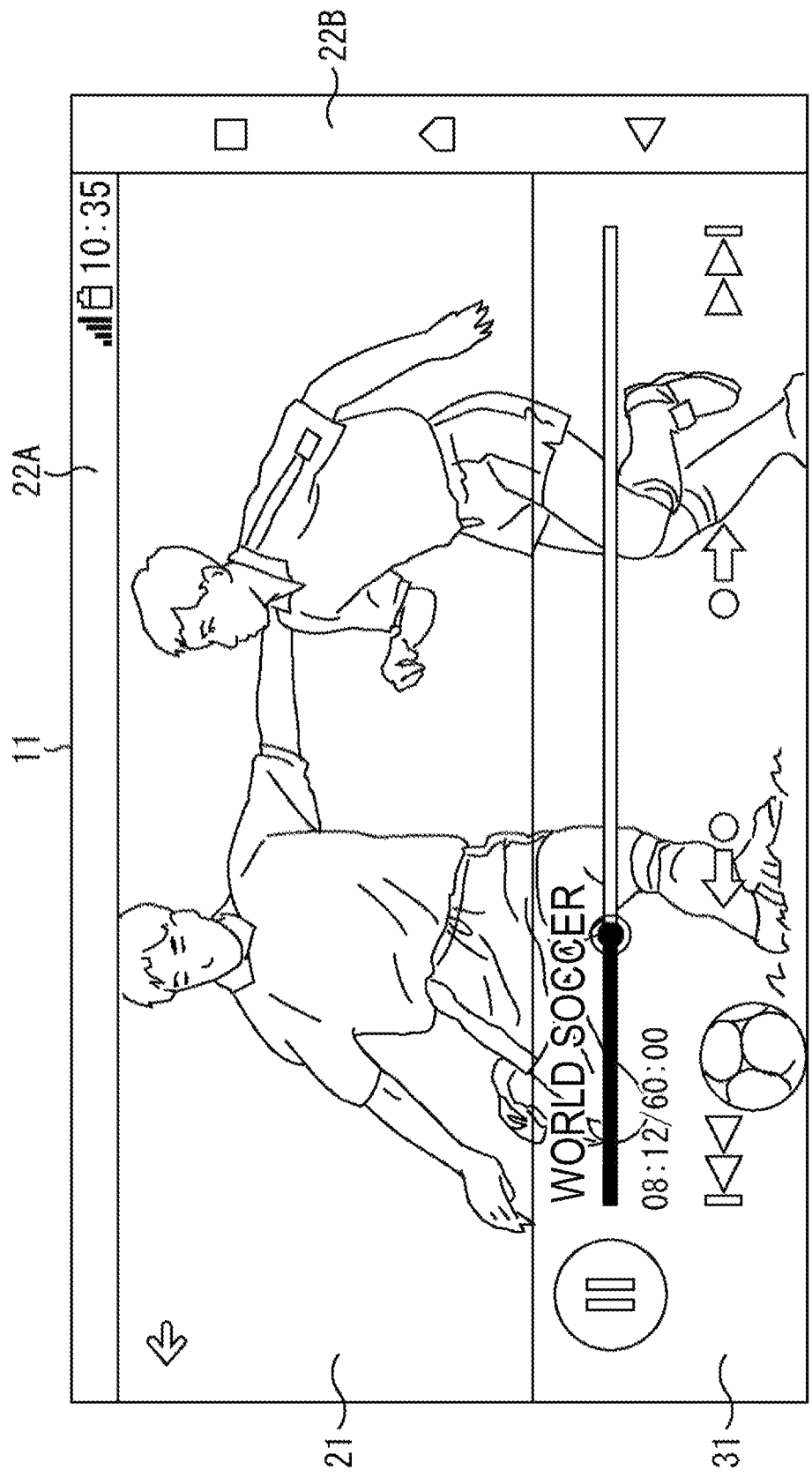
FIG. 2 is a diagram illustrating an example of a program viewing screen.

Hereinafter, a mode for carrying out the present technology will be described. The description will be given in the following order.

1. Regarding Contents-Viewing System
2. Regarding Display Screen
3. Configuration Example of Portable Terminal
4. Operation of Portable Terminal
5. Modified Example 1. Regarding Contents-Viewing System FIG. 1 is a diagram illustrating a configuration example of a content-viewing system according to an embodiment of the present technology.

The contents-viewing system of FIG. 1 includes a portable terminal 1 and a recording device 2. The portable terminal 1 is a portable information processing terminal such as a smartphone or a tablet terminal. On a surface of a housing of the portable terminal 1, a display 11 having, for example, a function of a touch panel is provided. A user of the portable terminal 1 can operate the portable terminal 1 by directly touching a screen displayed on the display 11 with a finger or the like.

The recording device 2 is a device incorporating therein a recording medium such as a hard disk drive (HDD), and a solid state drive (SSD) and having a function of recording a television program (hereinafter, simply referred to as a program). For example, the recording device 2 is installed at the home of the user of the portable terminal 1. The recording device 2 receives data of a program broadcast via a transmission path using a broadcast wave or a transmission path using communication such as the Internet, and records the data on a recording medium.

As illustrated by a bidirectional arrow, the portable terminal 1 and the recording device 2 can communicate via a network such as a local area network (LAN) at home, or the Internet. Between the portable terminal 1 and the recording device 2, settings for mutual communication are performed in advance.

The user of the portable terminal 1 can transfer the data of the recorded program recorded by the recording device 2 to the portable terminal 1, store the data in a memory inside the portable terminal 1, and view the recorded program at a place outside home and the like.

When the user operates the portable terminal 1 and selects a predetermined program from, for example, a list of recorded programs, data of the program is read from the memory and reproduction is started. Video of the recorded program is displayed on the display 11, and audio of the program is output from a speaker (not illustrated).

In addition, the user of the portable terminal 1 can transfer the data of the program being broadcast from the recording device 2 to the portable terminal 1 in real time without recording the data, and can view the program being broadcast at or outside home.

When the user operates the portable terminal 1 and selects a predetermined program being broadcast from, for example, a program table, a control command is transmitted from the portable terminal 1 to the recording device 2, and reception of the program and transmission of the program to the portable terminal 1 are started in the recording device 2. In the portable terminal 1, the program transmitted from the recording device 2 is received, and the reproduction of the program is started. The video of the program being broadcast is displayed on the display 11, and the audio is output from the speaker.

As described above, in the portable terminal 1, a TV-viewing application, which is a program for managing the viewing of the recorded program recorded by the recording device 2 as well as for managing the viewing of the program being broadcast received by the recording device 2, is installed. The video of the recorded program or the program being broadcast displayed on the display 11 of FIG. 1 is the video displayed by the TV-viewing application being activated.

Hereinafter, a program that is broadcast via a transmission path using a broadcasting wave or communication, as appropriate, and then is directly transmitted, by the recording device 2, to the portable terminal 1 without being recorded so that the program can be viewed on the portable terminal 1 is called a live-viewing program.

The live-viewing program is a program broadcast in accordance with a predetermined schedule on the broadcasting side. Since the live-viewing program is a program broadcast according to the predetermined schedule on the broadcasting side, when reproduction of the video is instructed after stopping the reproduction of the video, the reproduction is not started from the video when the reproduction is stopped, but the reproduction is started from a live video at the moment when the reproduction of the video is instructed. Therefore, a program distributed from a server on the network via the transmission path using communication is also the live-viewing program in a case where it is a live-distributed program. Incidentally, the "distribution" also includes "broadcasting."

2. Regarding Display Screen

FIG. 2 is a diagram illustrating an example of a program viewing screen.

The program viewing screen in FIG. 2 is a screen when the user holds the portable terminal 1 in a landscape orientation. Band-shaped areas 22A and 22B having a predetermined width are formed along an upper edge and a right edge of a display area of the display 11, and the video of the program is displayed on the entire display area 21 which is a horizontally-elongated area other than the areas 22A and 22B.

Below the display area 21, an operation panel 31 is displayed to be superimposed on the video of the program. On the operation panel 31, buttons and the like which are operated when performing various operations such as pause, fast forward, rewind, and chapter movement are displayed. That is, the programdisplayed in the display area 21 of FIG. 2 is the recorded program.

In a case where the program displayed in the display area 21 is a live-viewing program, a button and the like which are operated to switch channels are displayed on the operation panel 31.

Incidentally, the area 22A is an area in which time, an indicator and the like are displayed. The area 22B is an area in which an icon and the like operated to display a home screen are displayed.

Figure 3:
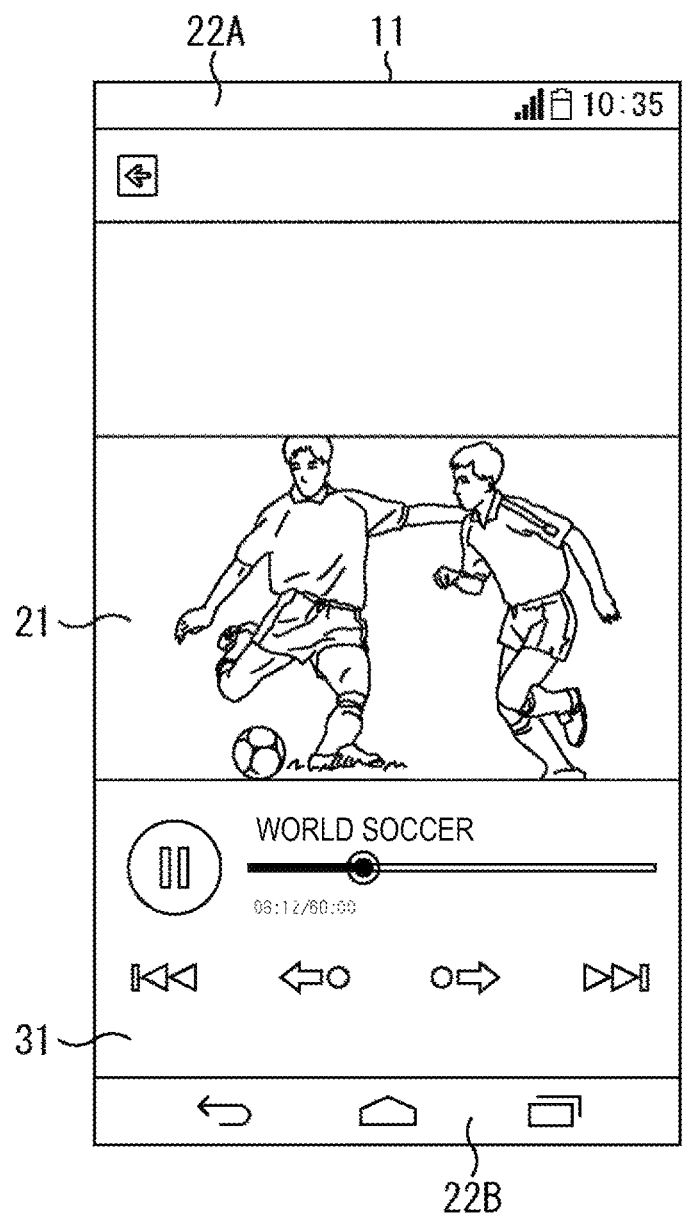
FIG. 3 is a diagram illustrating another example of a program viewing screen.

FIG. 3 is a diagram illustrating another example of a program viewing screen.

The program viewing screen in FIG. 3 is a screen when the user holds the portable terminal 1 in a portrait orientation. In the example of the program viewing screen in FIG. 3, the display area 21 is formed substantially at the center of the display 11, and the operation panel 31 is displayed below the display area 21. The areas 22A and 22B are formed along upper and lower edges of the display 11, respectively.

In this way, the user can view the program when the portable terminal 1 is set not only in the landscape orientation but in the portrait orientation.

An operating system (OS) of the portable terminal 1 has a so-called multi-window function of dividing the display area 21, excluding the areas 22A and 22B, into a plurality of display areas and displaying screens of different applications in the display areas respectively.

As display modes of the portable terminal 1, a single window mode for displaying a screen of one application and a multi-window mode for simultaneously displaying screens of a plurality of applications are prepared, as illustrated in FIGS. 2 and 3.

Figure 4:
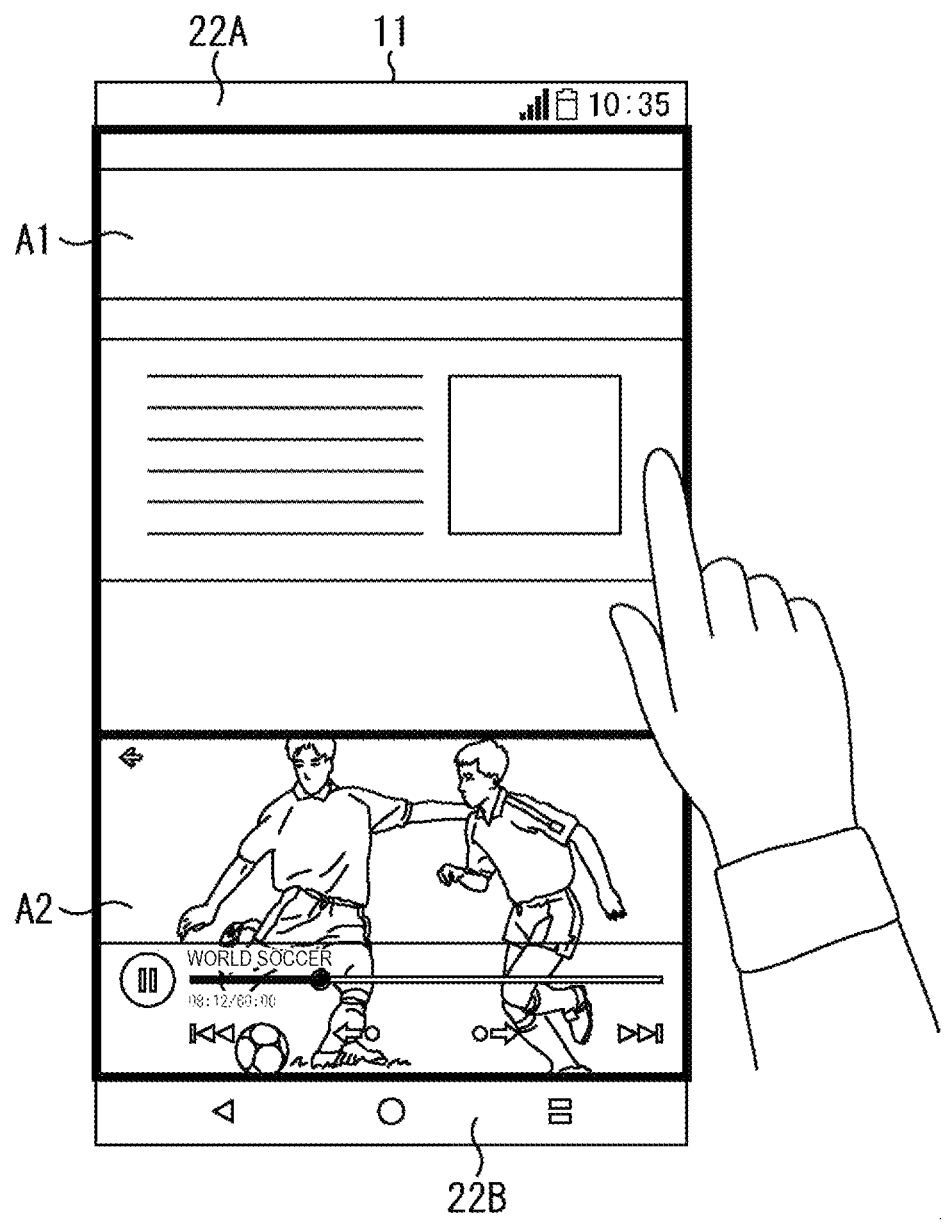
FIG. 4 is a diagram illustrating a display example in a multi-window mode.

FIG. 4 is a diagram illustrating a display example in the multi-window mode.

In the example of FIG. 4, a window A1 is formed in an upper portion and a window A2 is formed in a lower portion of the screen, as illustrated in thick frames. The window A2 is a display area having a ratio of the number of horizontal pixels to the number of vertical pixels of 16:9, and the window A1 is the remaining display area of a vertically elongated rectangle.

Further, in the example of FIG. 4, a predetermined Web page is displayed in the window A1 and a video of the program is displayed in the window A2. The display of the window A1 is based on a Web browser, and the display of the window A2 is based on the TV viewing application.

While the Web page is displayed in the window A1, the reproduction of the program is continued and the video of the program continues to be displayed as a moving image in the window A2. While the multi-window mode is being set, the operation panel 31 is superimposed on the video of the program.

Thus, while viewing the program in the window A2, the user can display the Web page in the window A1 and perform an operation such as an information search. Incidentally, while browsing the Web page, a speaker of the portable terminal 1 continues outputting the audio of the program in accordance with the display of the video of the window A2.

Figure 5:
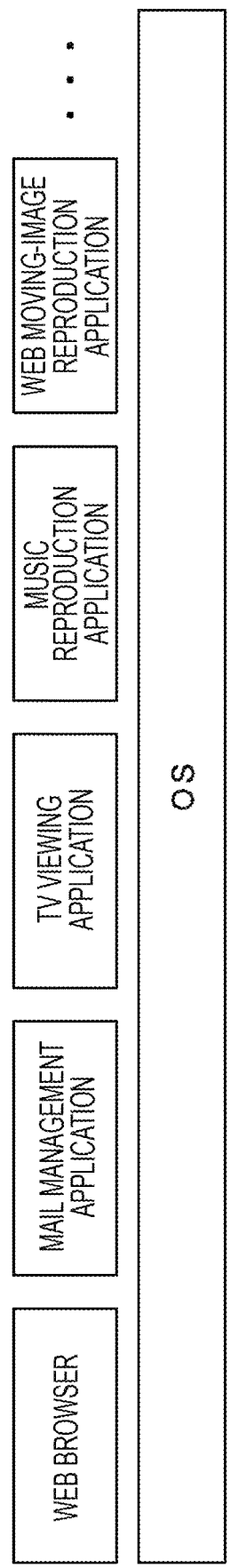
FIG. 5 is a diagram illustrating an example of an application.

As illustrated in FIG. 5, in addition to the TV viewing application and the Web browser, various applications operating on the OS, such as a mail management application, a music reproduction application and a Web moving-image reproduction application, are installed in the portable terminal 1.

Instead of the display by the Web browser, the user can also display the screen of another application in the window A1.

The mail management application is a mailer and manages transmitting and receiving e-mails.

The music reproduction application reproduces music data stored in the memory of the portable terminal 1 or music data received via the Internet and causes the speaker of the portable terminal 1 to output the music.

The Web moving-image reproduction application accesses a server providing a Web moving-image (moving-image contents) distribution service and reproduces the moving-image contents acquired by streaming or by downloading. The video of the reproduced Web moving-image is displayed on the display 11, and the audio of the Web moving-image is output from the speaker.

Figure 6:
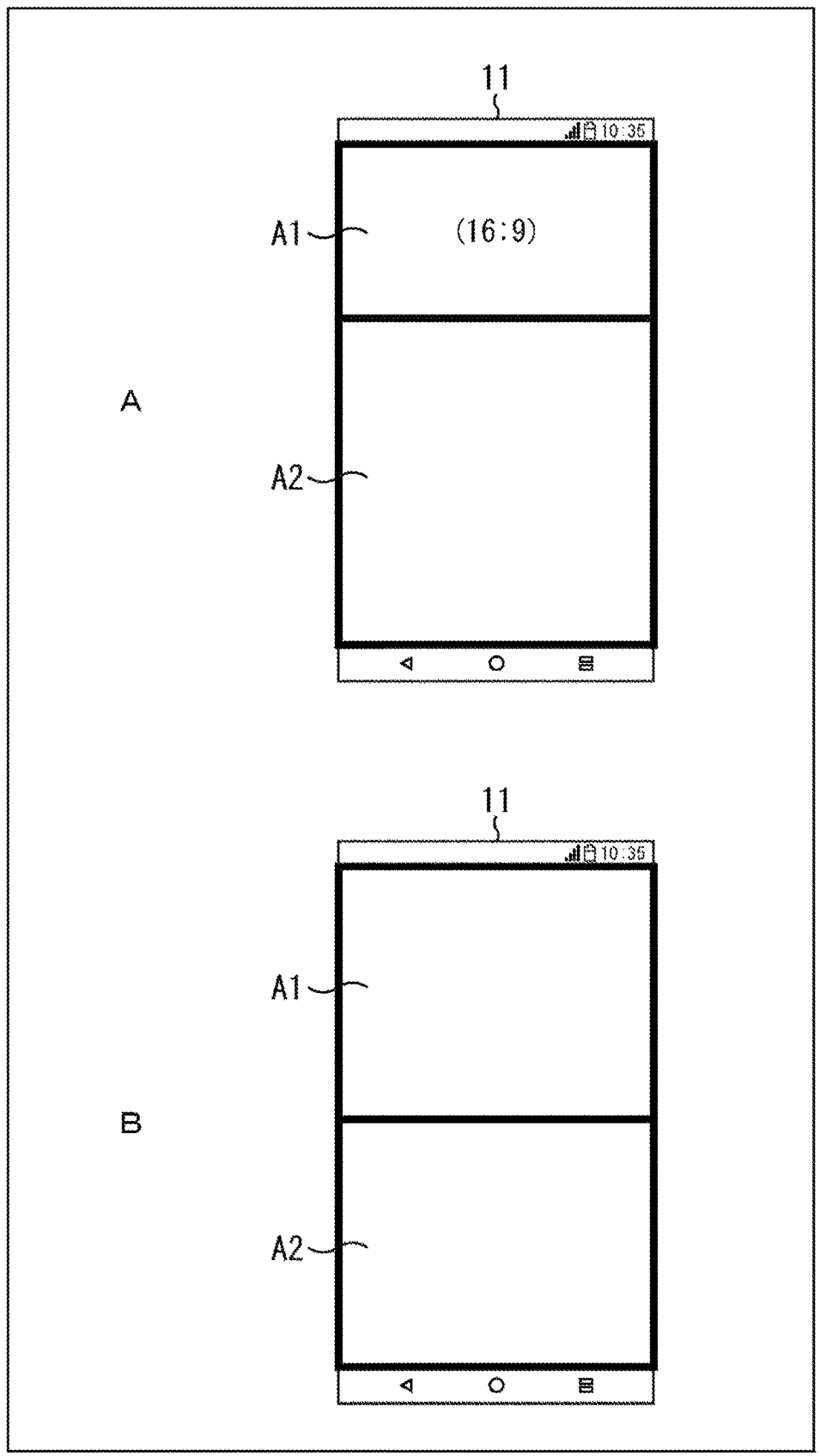
FIG. 6 is a diagram illustrating another display example in a multi-window mode.

FIG. 6 is a diagram illustrating another display example in the multi-window mode.

The display format shown in A of FIG. 6 is a format in which a window A1, which is a display area having a ratio of the number of horizontal pixels to the number of vertical pixels of 16:9, is formed in the upper portion of the screen, and the remaining display area of a vertically elongated rectangle is formed as the window A2 in the lower portion of the screen. The display format shown in B of FIG. 6 is a format in which the entire display area 21, excluding the areas 22A and the area 22B, is equally divided into upper and lower portions to form the window A1 and the window A2.

As described above, plural types of formats are prepared for the multi-window mode display format. Not only the display modes including the multi-window mode and the single window mode but also the display format at the time of setting the multi-window mode are set by the OS.

As the display format in the multi-window mode, not only a formation of arranging a plurality of display areas without gaps as illustrated in FIG. 6 but also a format of arranging the plurality of display areas at arbitrary positions with gaps may be used. In addition, a so-called PinP format, in which one display area smaller than another display area is arranged inside the another display area may be used.

Further, the number of display areas is not limited to two, and three or more display areas may be formed. The screen display in the multi-window mode is also used when the portable terminal 1 is used in the landscape orientation.

Figure 7:
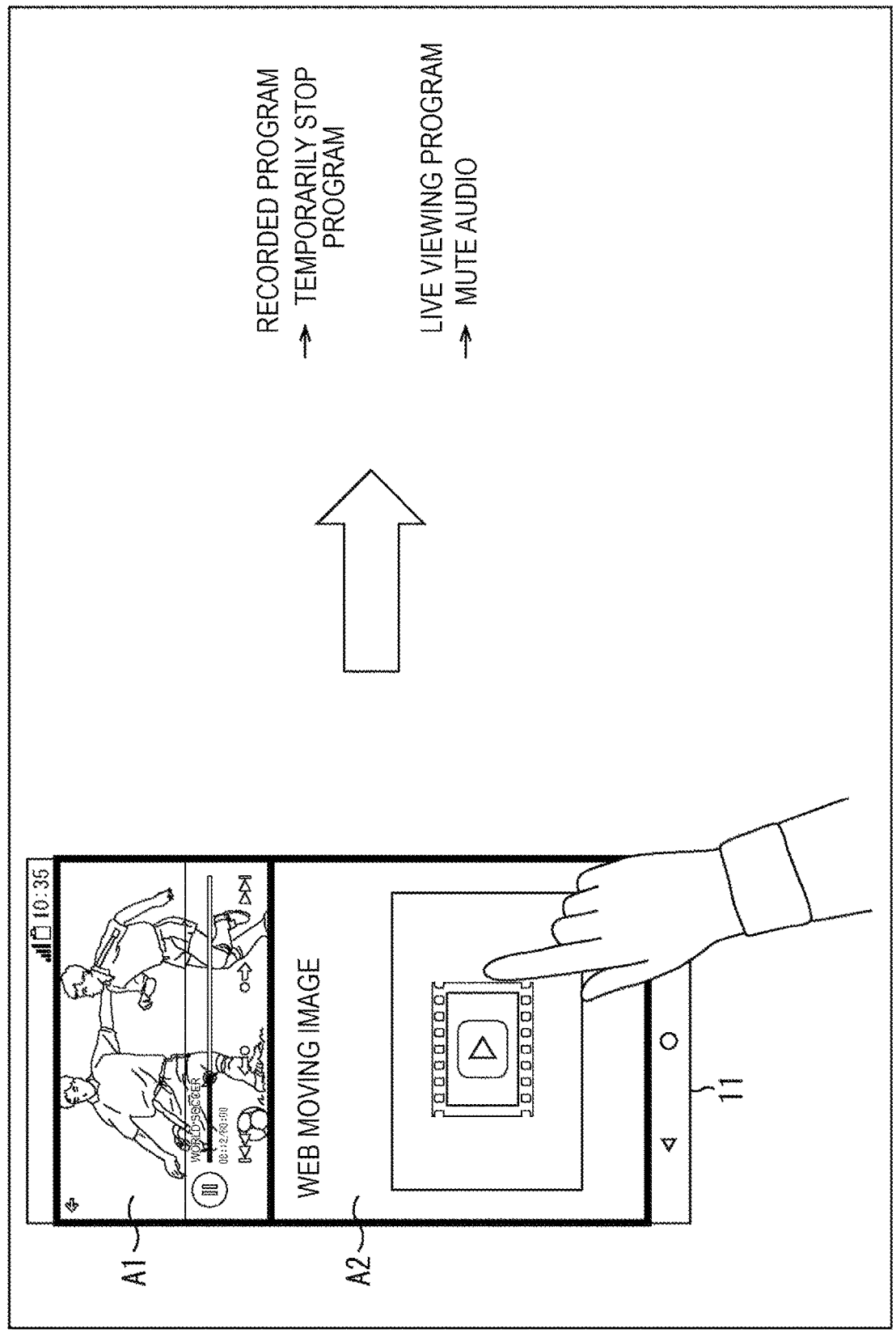
FIG. 7 is a diagram illustrating a display example during program reproduction by a TV viewing application.

FIG. 7 is a diagram illustrating a display example during program reproduction by a TV viewing application.

In a window A1 formed in an upper portion of the screen of FIG. 7, video of the program being reproduced is displayed as a screen of the TV viewing application. On the other hand, in a window A2 formed in a lower portion of the screen, a screen of a Web moving-image reproduction application is displayed. The display format of the screen in FIG. 7 is a display format illustrated in A of FIG. 6.

At this state, in a case where the user operates the display of the window A2 to start reproducing certain Web moving image, reproduction of the recorded the program is temporarily stopped (to be in a pause state), as indicated by an arrowhead, when the program being reproduced by the TV viewing application is the recorded program. In the window A1, one frame of the video that was reproduced last is displayed as a still image, and an audio output is also stopped.

In the window A2, the video of the Web moving image the user instructed to reproduce is displayed, and the audio of the Web moving-mage is output from a speaker in accordance with the display of the video.

As a result, the user can stop viewing the recorded program and view the Web moving image.

On the other hand, in a case where the reproduction of the Web moving image is started, when the program being reproduced by the TV viewing application is a live-viewing program, the reproduction of the live-viewing program is continued and the audio of the program is muted as indicated by an arrowhead. Although the audio is not output, the display of the video of the live-viewing program as the moving image is continued in the window A1.

In the window A2, the video of the Web moving image the user instructed to reproduce is displayed, and the audio of the Web moving image is output from the speaker in accordance with the display of the video.

As a result, the user can also view the Web moving image while continuing to display the video of the live-viewing program.

That is, in a case where the application accompanied with the sound output is executed during reproduction of the program by the TV viewing application and the application starts outputting sound, a behavior of the portable terminal 1 varies depending on whether the program being reproduced is a recorded program or a live-viewing program.

The Web moving-image reproduction application is an application accompanied with the sound output of moving-image contents. For example, the same applies to a case where the application being executed together with the TV viewing application is a music reproduction application. The music reproduction application is also an application accompanied with the sound output of music contents.

In a case where a screen of the music reproduction application is displayed in the window A2 during the reproduction of the program and then reproduction of a predetermined music is started by the music reproduction application, when the program being reproduced is the recorded program, the recorded program is stopped. In place of the audio of the recorded program, the music whose reproduction is newly started is output from the speaker.

On the other hand, when the program being reproduced is a live-viewing program, only the audio of the live-viewing program is muted and the display of the live-viewing program of the window A1 is continued. In place of the audio of the live-viewing program, the music whose reproduction is newly started is output from the speaker.

In a case where the application executed together with the TV viewing application is an application not accompanied with a sound output, such as a Web browser or a mail management application, the aforementioned control is not performed.

As described above, the operation is changed depending on whether or not the application being executed together with the TV viewing application is accompanied with the sound output, and whether the program being reproduced is the recorded program or the live-viewing program, whereby a control suitable for the user's intention becomes possible.

That is, in a case where a plurality of applications is activated at the same time, it is considered that the user pays more attention to the application that has been operated later.

Even in a case where the user pays attention to the application that has been operated later, if the application is not accompanied with the sound output, it is considered that there is no influence on the operation of the application to which the user pays attention even if the reproduction of the program including the audio output is continued. Rather, the continuation of reproducing the program including the audio output is preferable for the user, as it allows the user to perform a work while viewing the program.

On the other hand, in a case where the application operated later is accompanied with the sound output, priority should be given to the sound output by the application which the user pays attention to.

At this time, in a case where the program being reproduced is the recorded program, considering that the user is viewing the program even by recording the program, it is preferable to stop the reproduction of the program until the user pays attention to viewing the program again so that the user can finish viewing the program without overlooking even a part of the program. In addition, in a case where the program being reproduced is the live-viewing program, it is preferable to continue displaying the video although the audio is muted, since it allows the user to keep grasping an atmosphere of the program.

The reproduction of the recorded program stopped as described above is restarted when the user operates, for example, the display of the window A1 to release the temporary stop. In addition, the audio output of the muted live-viewing program is restarted when the user, for example, taps the video of the program of the window A1. When the user pays attention to viewing the program again, it returns to the same state as that before the operation is performed on the display of the window A2.

As described above, in a case where the audio outputs are conflicted, a series of processes of the portable terminal 1 that control the reproduction of the program in a manner that gives priority to the latter operation will be described later with reference to the flowchart.

3. Configuration Example of Portable Terminal

Figure 8:
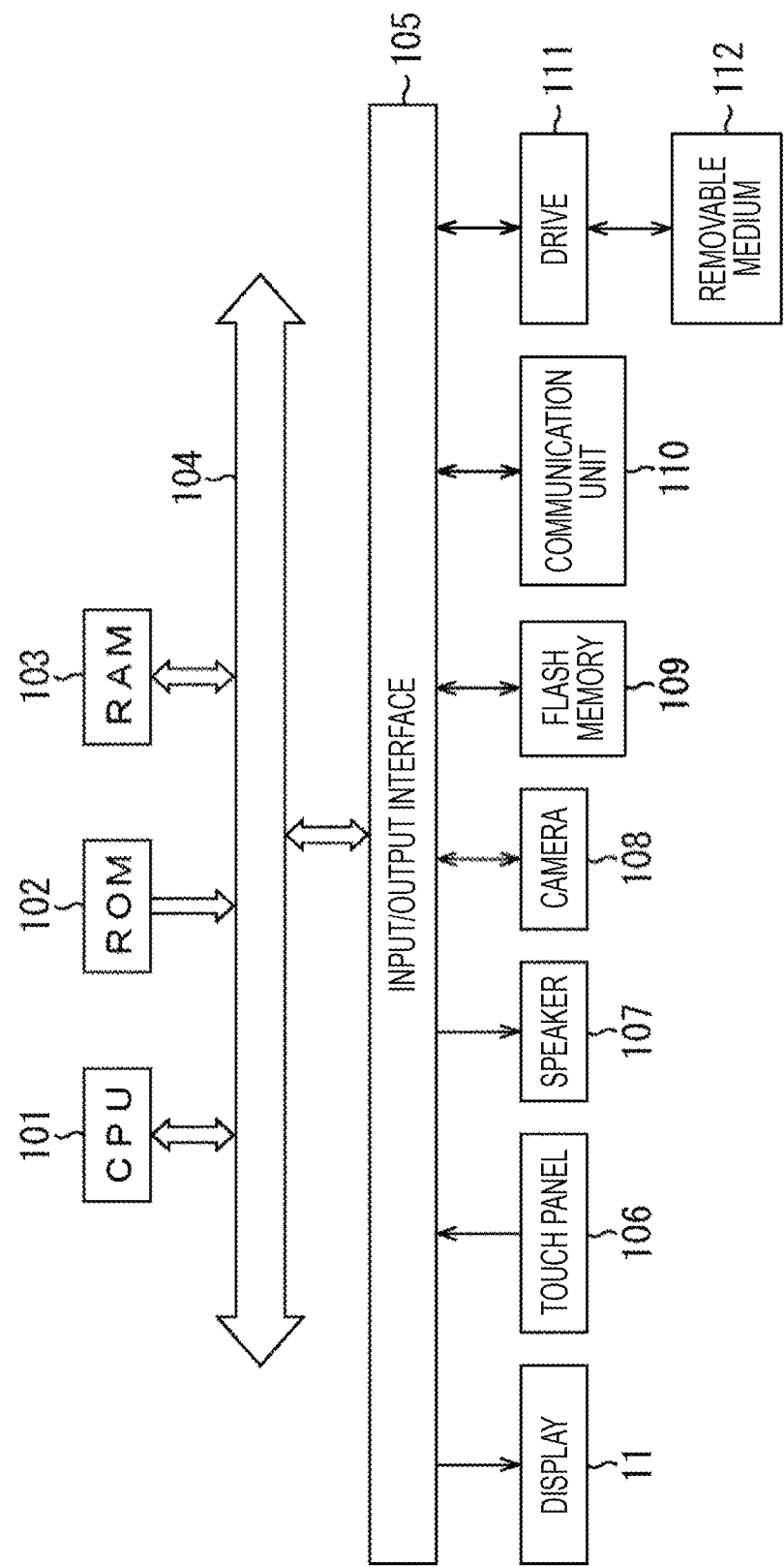
FIG. 8 is a block diagram illustrating an example of a hardware configuration of a portable terminal.

FIG. 8 is a block diagram illustrating an example of hardware configuration of the portable terminal 1.

A central processing unit (CPU) 101, a read only memory (ROM) 102, and a random access memory (RAM) 103 are mutually connected by a bus 104.

An input/output interface 105 is further connected to the bus 104. In addition to the display 11, a touch panel 106, a speaker 107, a camera 108, a flash memory 109, a communication unit 110, and a drive 111 are connected to the input/output interface 105.

The touch panel 106 detects a user's operation on a surface of the display 11 and outputs information representing contents of the user's operation.

The speaker 107 outputs various sounds such as audio of a program being reproduced, audio of a Web moving image, and music.

The camera 108 performs a photographing in accordance with a user's operation and outputs image data.

The flash memory 109 stores various kinds of data such as a program executed by the CPU 101 and data of a recorded program transferred from the recording device 2.

The communication unit 110 is an interface for wireless communication. The communication unit 110 communicates with an external device such as the recording device 2 or a server connected via the Internet.

The drive 111 drives a removable medium 112 such as a memory card, writes data to the removable medium 112, and reads the data stored in the removable medium 112. The provision of the data of the recorded program by the recording device 2 may be performed via the removable medium 112.

Figure 9:
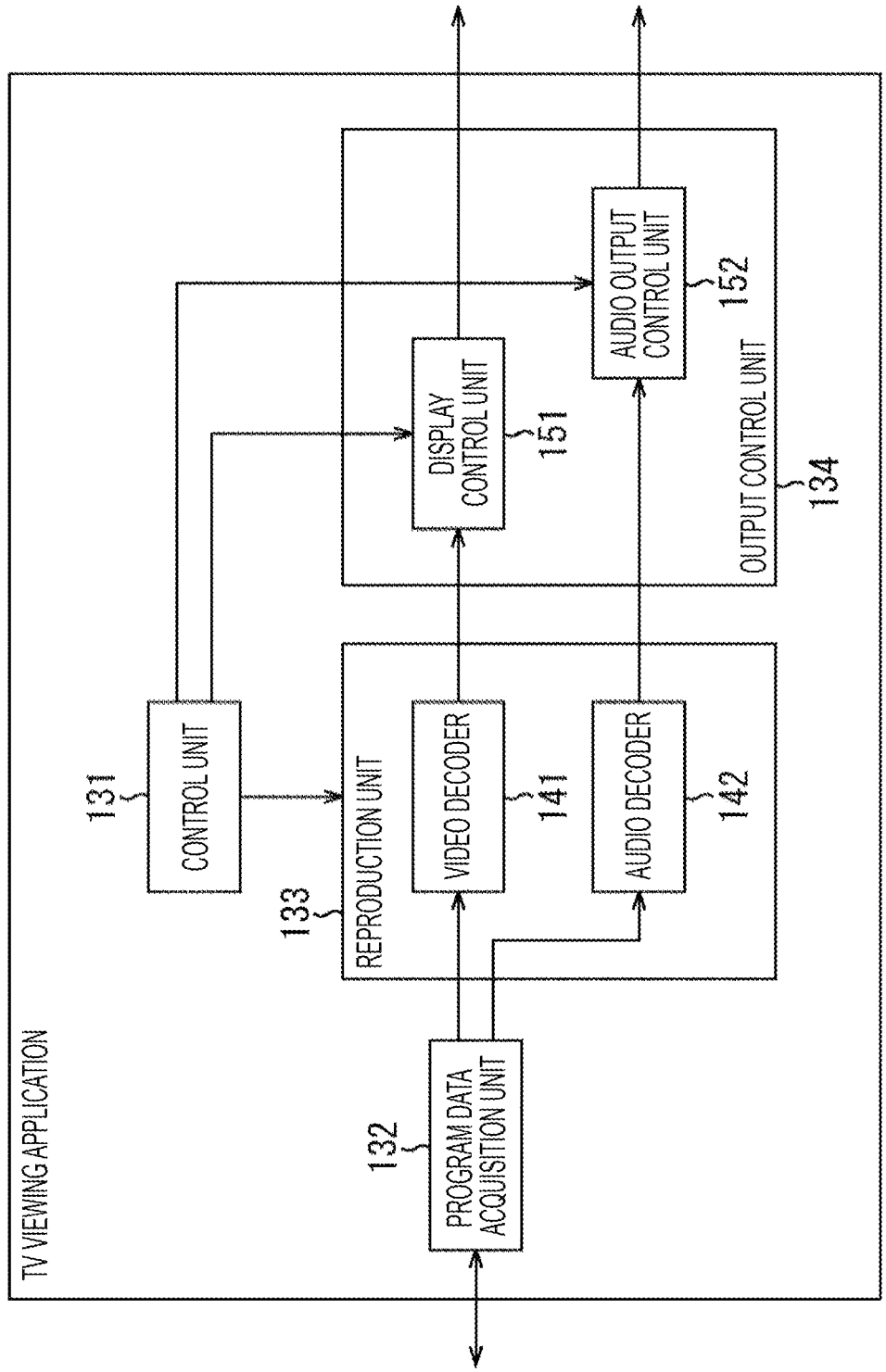
FIG. 9 is a block diagram illustrating a functional configuration example of a portable terminal.

FIG. 9 is a block diagram illustrating a functional configuration example of the portable terminal 1.

At least a part of functional units illustrated in FIG. 9 is implemented by the TV viewing application being executed by the CPU 101 in FIG. 8. In the portable terminal 1, various programs illustrated in FIG. 5 are executed by the CPU 101, whereby other functional units are also implemented.

By executing the TV viewing application, a control unit 131, a program data acquisition unit 132, a reproduction unit 133, and an output control unit 134 are implemented in the portable terminal 1. The reproduction unit 133 includes a video decoder 141 and an audio decoder 142. Further, the output control unit 134 includes a display control unit 151 and an audio output control unit 152.

The control unit 131 controls reproduction of program data by the reproduction unit 133, display of video of the program by the display control unit 151, and an audio output of the program by the audio output control unit 152, respectively.

The control by the control unit 131 is performed, for example, according to a type of another application being executed together with the TV viewing application (whether or not it is an application accompanied with a sound output). In addition, in a case where another application is accompanied with the sound output, the control by the control unit 131 is performed in response to reception of a notification that the audio output is started from the application.

The program data acquisition unit 132 acquires the data of the program to be reproduced. In a case where a recorded program is reproduced, the program data acquisition unit 132 reads and acquires the data of the recorded program from the flash memory 109 and the removable medium 112. Further, in a case where a live-viewing program is reproduced, the program data acquisition unit 132 controls the communication unit 110 to receive and acquire the data of the live-viewing program transmitted from the recording device 2.

The program data acquisition unit 132 extracts the video data from the data of the recorded program or the live-viewing program and outputs the video data to the video decoder 141 of the reproduction unit 133, and extracts the audio data and outputs the audio data to the audio decoder 142.

The video decoder 141 of the reproduction unit 133 decodes the video data of the recorded program or the live-viewing program, and outputs data of video of the program acquired by the decoding to the display control unit 151.

The audio decoder 142 decodes the audio data of the recorded program or the live-viewing program, and outputs data of audio of the program acquired by the decoding to the audio output control unit 152.

The display control unit 151 displays the video of the program on the display 11 on the basis of the data supplied from the video decoder 141.

On the basis of the data supplied from the audio decoder 142, the audio output control unit 152 causes the speaker 107 to output the audio of the program.

4. Operation of Portable Terminal

Figure 10:
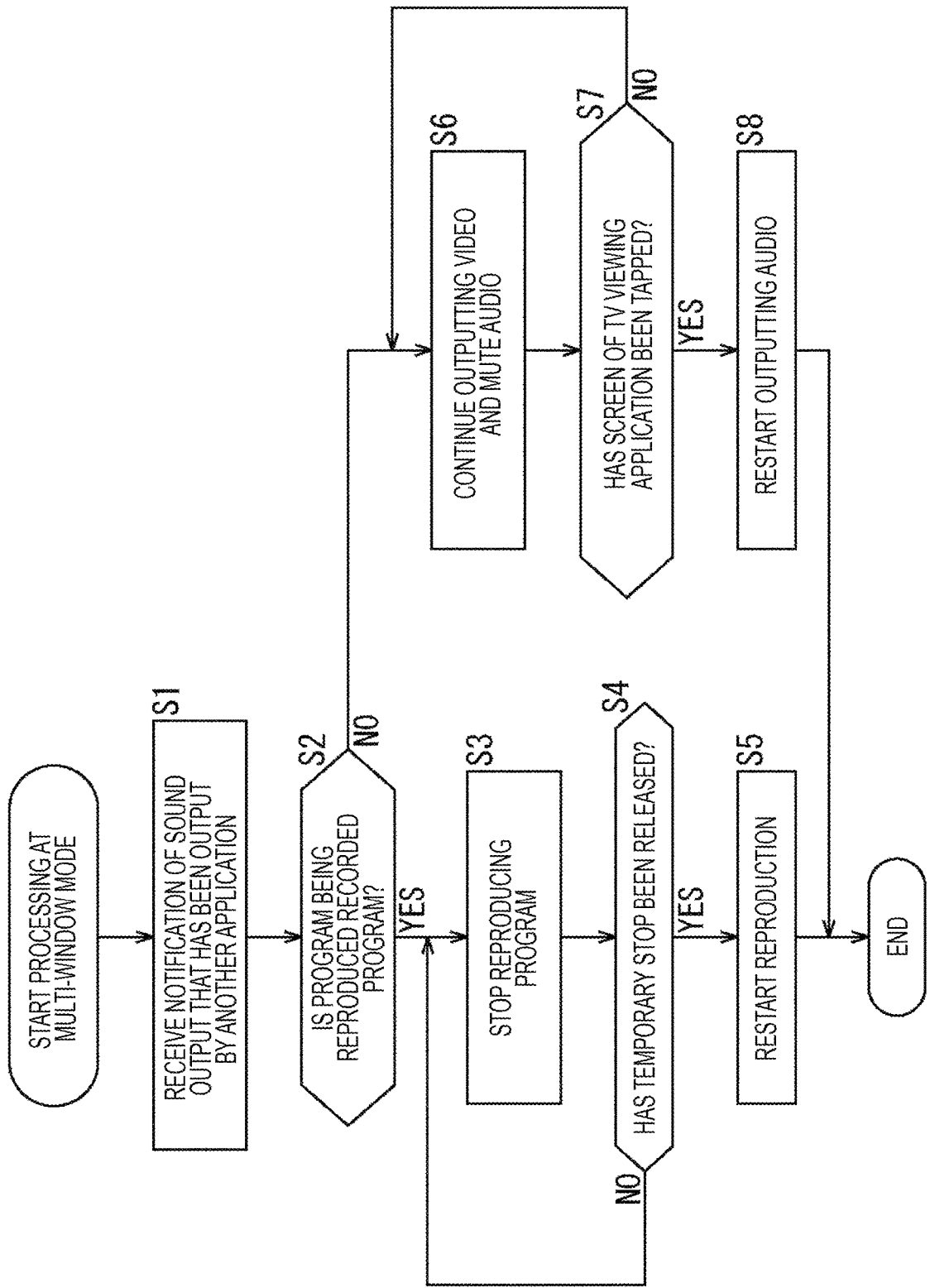
FIG. 10 is a flowchart illustrating an operation of a TV viewing application.

Next, an operation of the TV viewing application in a case where a multi-window mode is set as a display mode of the display 11 will be described with reference to the flowchart of FIG. 10.

The display mode of the display 11 is set by the OS in accordance with, for example, a user's operation. In a case where the multi-window mode is set, in addition to the TV viewing application, another application is executed by the CPU 101.

Here, it is assumed that another application executed together with the TV viewing application is an application accompanied with the sound output.

Further, it is assumed that the program data is acquired by the program data acquisition unit 132 and the reproduction of the program data is performed by the reproduction unit 133. The video of the program being reproduced is displayed in, for example, the window A1 of the display 11 by the display control unit 151, and the audio of the program is output from the speaker 107 by the audio output control unit 152.

In this case, the screen of another application accompanied with the sound output and being executing together with the TV viewing application is displayed in the window A2. The screen of the TV viewing application may be displayed in the window A2 and the screen of another application may be displayed in the window A1.

In step S1, the control unit 131 receives a notification of starting the sound output that has been output from another application.

For example, such a notification is output from a Web moving-image reproduction application which is an application accompanied with the sound output in a case where the user performs an operation to start reproducing a predetermined Web moving image. Further, such a notification is output from the music reproduction application in a case where the user performs an operation to start reproducing a predetermined music. Such a notification of starting the sound output is not output while the user performs an operation such as an operation for searching for the contents, other than the operation to start the sound output, on the display of the window A2.

In step S2, the control unit 131 determines whether or not the program being reproduced is the recorded program.

In a case where it is determined in step S2 that the program being reproduced is a recorded program, the control unit 131 stops reproducing the recorded program in step S3. The control unit 131 causes the video decoder 141 to stop decoding the video data, and causes the audio decoder 142 to stop decoding the audio data. The display control unit 151 continues displaying one frame of the video output last as a still image in the window A1.

In response to the stop of reproduction of the recorded program, another application starts outputting the sound from the speaker 107.

In step S4, the control unit 131 determines whether or not release of the temporary stop (reproduction start) has been instructed. The status of the temporary stop is released, for example, when the user presses a reproduction button displayed on the screen of the TV viewing application. In a case where it is determined in step S4 that the release of the temporary stop has not been instructed, the control unit 131 returns to step S3, and continues to stop reproducing the recorded program.

On the other hand, in a case where it is determined in step S4 that the release of the temporary stop has been instructed by pressing the reproduction button, the control unit 131 proceeds to step S5 to restart reproducing the recorded program. The state of temporary stop may be released by tapping the video of the program being stopped instead of pressing the reproduction button.

The control unit 131 causes the video decoder 141 to restart decoding the video data, and causes the audio decoder 142 to restart decoding the audio data. The display control unit 151 causes the video of the program to be displayed as a moving image in the window A1 on the basis of the data supplied from the video decoder 141, and the audio output control unit 152 outputs the audio of the program on the basis of the data supplied from the audio decoder 142 from the speaker 107. Thereafter, the process is terminated.

In a case where it is determined in step S2 that the program being reproduced is not the recorded program but a live-viewing program, in step S6, the control unit 131 continues outputting the video of the live-viewing program and mutes the audio.

That is, the control unit 131 causes the video decoder 141 to continue decoding the video data and causes the display control unit 151 to continue displaying the video of the live-viewing program as the moving image. In addition, the control unit 131 causes the audio decoder 142 to continue decoding the audio data, and causes the audio output control unit 152 to mute (disconnect) the audio.

In response to the operation of muting the audio, another application starts outputting the sound from the speaker 107.

In step S7, the control unit 131 determines whether or not the video of the program displayed as the screen of the TV viewing application is tapped. In a case where it is determined in step S7 that the video is not tapped, the control unit 131 returns to step S6, and continues muting the audio of the live-viewing program.

On the other hand, in a case where it is determined in step S7 that the video has been tapped, the control unit 131 proceeds to step S8, and controls the audio output control unit 152 to restart the audio output. The muteness of audio is released by the audio output control unit 152, and the audio of the live-viewing program is output from the speaker 107 in accordance with the video. Thereafter, the process is terminated.

With the above processing, it is possible to properly control the audio output of the program being reproduced depending on the type of another application being executed and the type of the program being reproduced.

5. Modified Example

In the above description, in a case where the reproduction of the Web moving image or the music is started during the reproduction of the program, the reproduction of the recorded program is stopped or the audio of the live-viewing program is muted. However, the contents whose reproduction is stopped or whose audio is muted are not limited to the program.

That is, in a case where the reproduction of the program is started during the reproduction of the contents including the audio such as a Web moving image, a music and a game, the reproduction of the contents may be stopped or the audio of the contents may be muted.

In a case where there is no notification of starting the sound output from another application, sounds of a plurality of applications may be output at the same time.

A case where the program is viewed on the portable information processing terminal has been described, but the aforementioned function can be applied to various terminals that can be used for viewing the program. For example, it can be applied to a terminal such as a television receiver, a recording device, a stationary or portable game machine, a set top box, and a personal computer.

Further, in the aforementioned description, the recording device 2 is a device installed at the home of the user of the portable terminal 1, but is not limited thereto, and a server on the Internet may be used as the recording device 2. In addition, in a case where the program broadcast from the server is not the live-viewing program, the program may be reproduced at any time, so it may be handled in the similar way as the recorded program.

Example of Program

The series of processes described above may be executed by hardware or software. In a case where the series of processing is executed by software, a program constituting the software is installed in a computer incorporating a dedicated hardware, a general-purpose personal computer, or the like.

The program to be installed is recorded and provided in the removable medium 112 constituted by semiconductor memories and the like, illustrated in FIG. 8. Further, it may be provided via a wired or wireless transmission medium such as a local area network, the Internet, or a digital broadcast. The program may be installed in the ROM 102 or the flash memory 109 in advance.

Incidentally, the program executed by the computer may be a program by which processing is performed in chronological order according to the order described in the present specification, or may be a program by which the processing is performed in parallel or at a necessary timing such as when a call is made.

Incidentally, in the present specification, the term "system" means a group of a plurality of constituent elements (devices, modules (parts), etc.), and whether or not all the constituent elements are in the same housing is irrelevant. Therefore, a plurality of devices that is housed in separate housings and are connected via a network, and one device that houses a plurality of modules in one housing are also systems.

The embodiments of the present technology are not limited to the aforementioned embodiments, and various modifications are possible without departing from the gist of the present technology.

For example, in the present technology, it is possible to adopt a configuration of cloud computing in which one function is shared by a plurality of devices via a network, and is collaboratively processed.

Further, each step described in the aforementioned flow chart may be executed by one device or shared and executed by a plurality of devices.

Further, in a case where a plurality of processes is included in one step, the plurality of processes included in the one step may be executed by one device or shared and executed by the plurality of devices.

Combination Example of Configuration

The present technology may have the following configuration.

(1)

An information processing terminal including:

a reproduction unit that reproduces contents including video and audio;

a reproduction control unit that, in a case where a display mode of a display is set to a mode that displays screens of a plurality of applications being executed on different display areas respectively at the same time, the applications including a first application that manages reproduction of the contents, and where the video of the contents being reproduced is displayed on a first display area and, at the same time, a screen of a second application is displayed on a second display area, stops reproducing the contents when the contents being reproduced are recorded contents and continues reproducing the contents when the contents being reproduced are live-viewing contents, at the time of starting a sound output by the second application; and an output control unit that continues displaying the video of the contents whose reproduction has been continued on the first display area and mutes the audio of the contents whose reproduction has been continued.

(2)

The information processing terminal according to (1), in which in a case where the second application is an application not accompanied with the sound output and a user performs an operation of the second application, the reproduction control unit continues reproducing the contents even when the contents being reproduced are recorded contents.

(3)

The information processing terminal according to (1) or (2), in which in a case where the reproduction of the recorded contents is stopped, the reproduction control unit restarts reproducing the recorded contents when an operation is performed for the first display area, and the output control unit restarts displaying the video of the contents whose reproduction has been restarted and outputting the audio of the contents whose reproduction has been restarted.

(4)

The information processing terminal according to any one of (1) to (3), in which while the reproduction of the recorded content is stopped, the output control unit continues displaying, as a still image, one frame of the video before the reproduction is stopped on the first display area.

(5)

The information processing terminal according to any one of (1) to (4), in which in a case where the audio of the live-viewing contents is muted, the output control unit restarts outputting the audio when an operation is performed for the first display area.

(6)

An information processing method, including steps of:
reproducing contents including video and audio;
in a case where a display mode of a display is set to a mode that displays screens of a plurality of applications being executed respectively on different display areas at the same time, the applications including a first application that manages reproduction of the contents, and the video of the contents being reproduced is displayed on a first display area and, at the same time, a screen of a second application is displayed on a second display area, stopping reproducing the contents when the contents being reproduced are recorded contents and continuing to reproduce the contents when the contents being reproduced are live-viewing contents, when a sound output by the second application is started; and
continuing to display the video of the contents whose reproduction has been continued on the first display area and muting the audio of the contents whose reproduction has been continued.

(7)

A program that causes a computer to execute processing including steps:
reproducing contents including video and audio;
in a case where a display mode of a display is set to a mode that displays screens of a plurality of applications being executed respectively on different display areas at the same time, the applications including a first application that manages reproduction of the contents, and the video of the contents being reproduced is displayed on a first display area and, at the same time, a screen of a second application is displayed on a second display area, stopping reproducing the contents when the contents being reproduced are recorded contents and continuing to reproduce the contents when the contents being reproduced are live-viewing contents, when a sound output by the second application is started; and
continuing to display the video of the contents whose reproduction has been continued on the first display area and muting the audio of the contents whose reproduction has been continued.

REFERENCE SIGNS LIST

1 Information processing terminal
2 Recording device
131 Control unit
132 Program data acquisition unit
133 Reproduction unit
134 Output control unit
141 Video decoder
142 Audio decoder
151 Display control unit
152 Audio output control unit

The invention claimed is:

1. An information processing terminal comprising:
a reproduction unit that reproduces contents including video and audio;
a reproduction control unit that, in a case where a display mode of a display is set to a mode that displays screens of a plurality of applications being executed on different display areas respectively at the same time, the applications including a first application that manages reproduction of the contents, and where the video of the contents being reproduced is displayed on a first display area and, at the same time, a screen of a second application is displayed on a second display area, stops reproducing the contents, in response to a notification that the second application outputs audio, when the contents being reproduced are recorded contents and continues reproducing the contents when the contents being reproduced are live-viewing contents, at the time of starting a sound output by the second application; and
an output control unit that continues displaying the video of the contents whose reproduction has been continued on the first display area and mutes the audio of the contents whose reproduction has been continued.

2. The information processing terminal according to claim 1, wherein in a case where the second application is an application not accompanied with the sound output and a user performs an operation of the second application, the reproduction control unit continues reproducing the contents even when the contents being reproduced are recorded contents.

3. The information processing terminal according to claim 1, wherein in a case where the reproduction of the recorded contents is stopped, the reproduction control unit restarts reproducing the recorded contents when an operation is performed for the first display area, and
the output control unit restarts displaying the video of the contents whose reproduction has been restarted and outputting the audio of the contents whose reproduction has been restarted.

4. The information processing terminal according to claim 1, wherein while the reproduction of the recorded content is stopped, the output control unit continues displaying, as a still image, one frame of the video before the reproduction is stopped on the first display area.

5. The information processing terminal according to claim 1, wherein in a case where the audio of the live-viewing contents is muted, the output control unit restarts outputting the audio when an operation is performed for the first display area.

6. An information processing method comprising the steps of:
reproducing contents including video and audio;
in a case where a display mode of a display is set to a mode that displays screens of a plurality of applications being executed respectively on different display areas at the same time, the applications including a first application that manages reproduction of the contents, and the video of the contents being reproduced is displayed on a first display area and, at the same time, a screen of a second application is displayed on a second display area, stopping reproducing the contents, in response to a notification that the second application outputs audio, when the contents being reproduced are recorded contents and continuing to reproduce the contents when the contents being reproduced are live-viewing contents, when a sound output by the second application is started; and
continuing to display the video of the contents whose reproduction has been continued on the first display area and muting the audio of the contents whose reproduction has been continued.

7. A non-transitory computer-readable medium having stored thereon a program that causes a computer to execute processing including the steps of:
reproducing contents including video and audio;
in a case where a display mode of a display is set to a mode that displays screens of a plurality of applications being executed respectively on different display areas at the same time, the applications including a first application that manages reproduction of the contents, and the video of the contents being reproduced is displayed on a first display area and, at the same time, a screen of a second application is displayed on a second display area, stopping reproducing the contents in response to a notification that the second application outputs audio, when the contents being reproduced are recorded contents and continuing to reproduce the contents when the contents being reproduced are live-viewing contents, when a sound output by the second application is started; and
continuing to display the video of the contents whose reproduction has been continued on the first display area and muting the audio of the contents whose reproduction has been continued.

* * * * *